(12) United States Patent
Horng et al.

(10) Patent No.: US 8,360,747 B2
(45) Date of Patent: Jan. 29, 2013

(54) MINIATURE FAN

(75) Inventors: Alex Horng, Kaohsiung (TW); Tso-Kuo Yin, Kaohsiung (TW); Tsung-Hsin Cheng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 760 days.

(21) Appl. No.: 12/484,405

(22) Filed: Jun. 15, 2009

(65) Prior Publication Data

US 2010/0316509 A1  Dec. 16, 2010

(51) Int. Cl.
F04B 35/04 (2006.01)
H02K 21/12 (2006.01)
H02K 1/22 (2006.01)

(52) U.S. Cl. ............... 417/354; 417/423.7; 310/156.32; 310/268; 310/71

(58) Field of Classification Search .................. 417/352, 417/353, 354, 423.7, 423.14; 310/156.32–156.37, 310/268, 71, 67 R, DIG. 6
See application file for complete search history.

(56) References Cited

U.S. PATENT DOCUMENTS

| | | | |
|---|---|---|---|
| 6,544,011 B2 | 4/2003 | Hsieh | |
| 6,710,486 B1 | 3/2004 | Horng et al. | |
| 6,998,751 B2 * | 2/2006 | Lopatinsky et al. | 310/208 |
| 7,038,913 B2 | 5/2006 | Lee et al. | |
| 7,134,839 B2 | 11/2006 | Horng et al. | |
| 7,232,292 B2 * | 6/2007 | Lopatinsky et al. | 417/423.1 |
| 7,237,599 B2 * | 7/2007 | Lopatinsky et al. | 165/80.3 |
| 7,291,956 B2 * | 11/2007 | Itoh et al. | 310/208 |

FOREIGN PATENT DOCUMENTS

| | | |
|---|---|---|
| CN | 101060766 A | 10/2007 |
| JP | 1997201023 | 7/1997 |
| JP | 10248224 A | 9/1998 |
| JP | 2000197328 A | 7/2000 |
| JP | 2002142427 A | 5/2002 |
| TW | I293106 | 2/2008 |
| TW | 200848619 A | 12/2008 |

* cited by examiner

*Primary Examiner* — Devon Kramer
*Assistant Examiner* — Bryan Lettman
(74) *Attorney, Agent, or Firm* — Alan Kamrath; Kamrath IP Lawfirm, P.A.

(57) ABSTRACT

A miniature fan includes a housing having a mounting portion with a shaft seat. A base is mounted to the mounting portion of the housing. The base includes first and second faces spaced along an axis. An outer layer is provided on the first face of the base. A bottom layer is provided on the second face of the base. The base further includes a coil unit intermediate the outer layer and the bottom layer. The coil unit is electrically connected to a drive circuit. An impeller includes a shaft and a permanent magnet. The shaft is coupled to the shaft seat of the housing and rotatable about the axis. The permanent magnet is aligned with the coil unit. The axial height of the miniature fan is reduced, and the structure of the miniature fan is simplified.

7 Claims, 8 Drawing Sheets

MINIATURE FAN

BACKGROUND OF THE INVENTION

1. Field of the Invention

The present invention relates to a miniature fan and, more particularly, to a miniature fan with a reduced axial height and with a reduced volume.

2. Description of the Related Art

Figure 1:
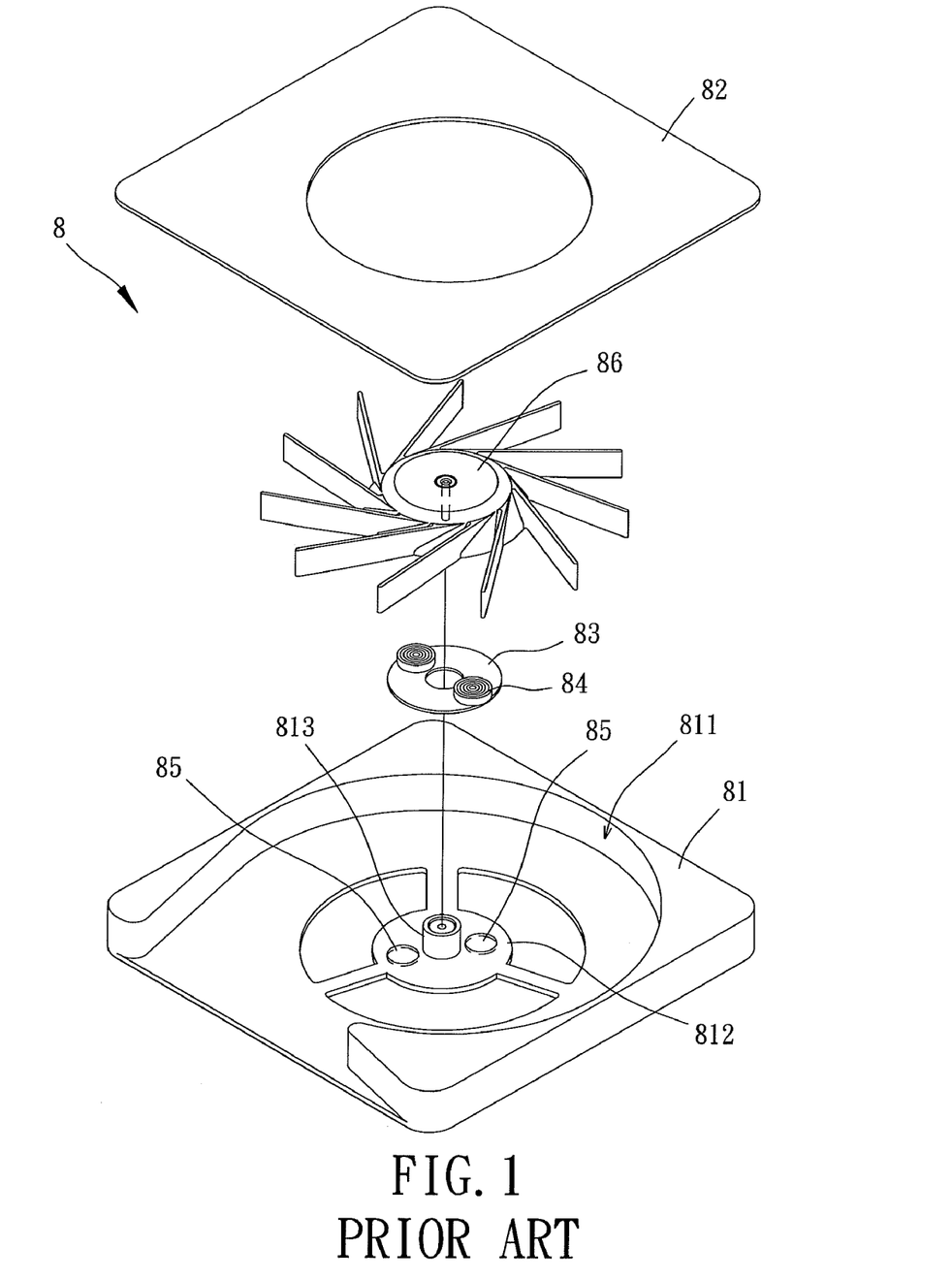
FIG. 1 shows an exploded, perspective view of a conventional miniature fan.
Figure 2:
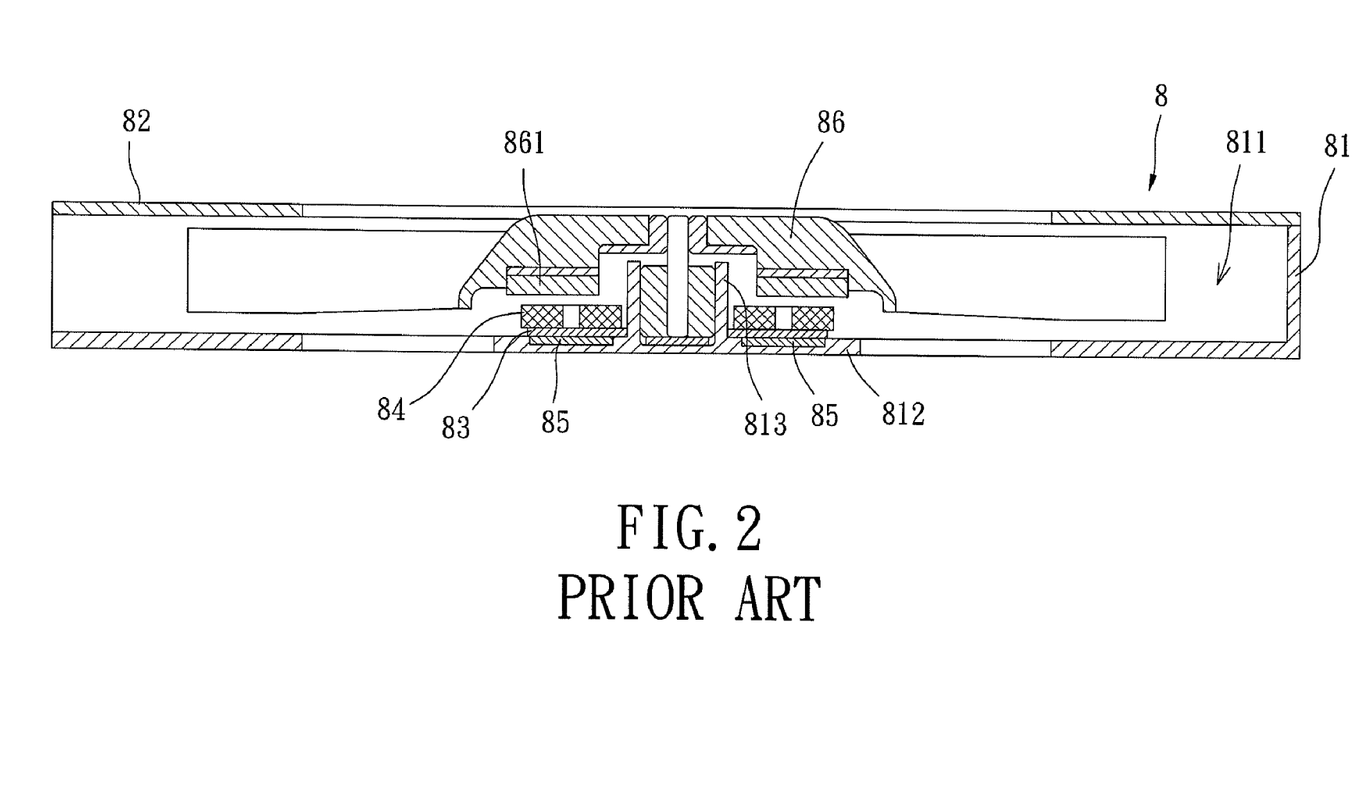
FIG. 2 shows a cross sectional view of the miniature fan of FIG. 1.

FIGS. 1 and 2 show a conventional heat-dissipating fan 8 including a housing 81 and a lid 82 mounted on top of the housing 81. The housing 81 includes a compartment 811 in which a base 812 is formed. A circuit board 83 and a coil unit 84 are mounted on the base 812. The base 812 further includes at least two positioning members 85. A shaft tube 813 is formed on a center of the base 812. A rotor 86 is rotatably coupled to the shaft tube 813 and rotatably received in the compartment 811. A magnet 861 is mounted to an inner side of the rotor 86 and interacts with the coil unit 84 to drive the rotor 86 to rotate. The heat-dissipating fan 8 can be mounted on differing electronic devices or equipment for heat-dissipating purposes. However, the axial heights of the circuit board 83 and the coil unit 84 outside of the circuit board 83 cause limitation to the reduction in the overall axial height of the heat-dissipating fan. As a result, it is difficult to achieve a light, compact design of the heat-dissipating fan 8 and, thus, it is difficult to mount the heat-dissipating fan 8 in miniature electronic devices or equipment.

Figure 3:
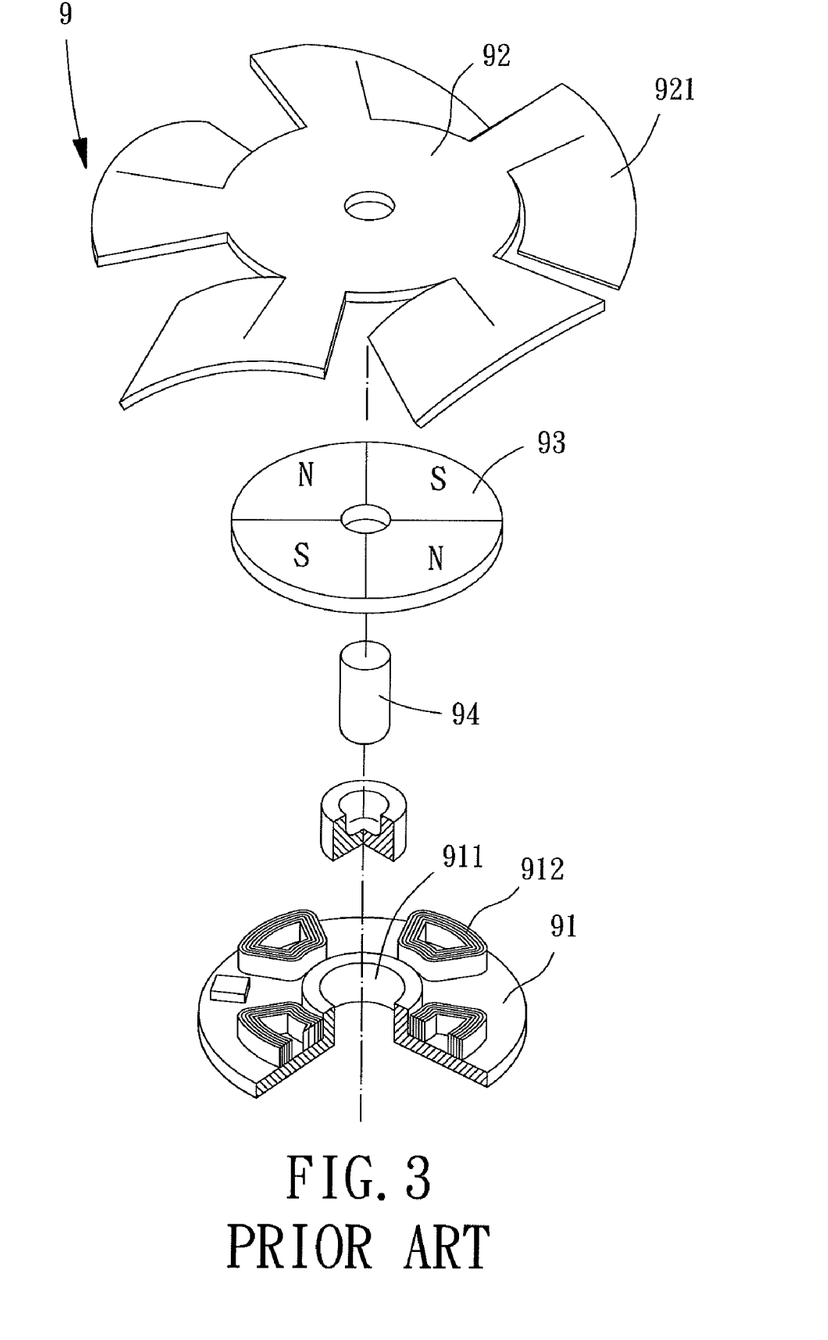
FIG. 3 shows an exploded, perspective view of another conventional miniature fan.
Figure 4:
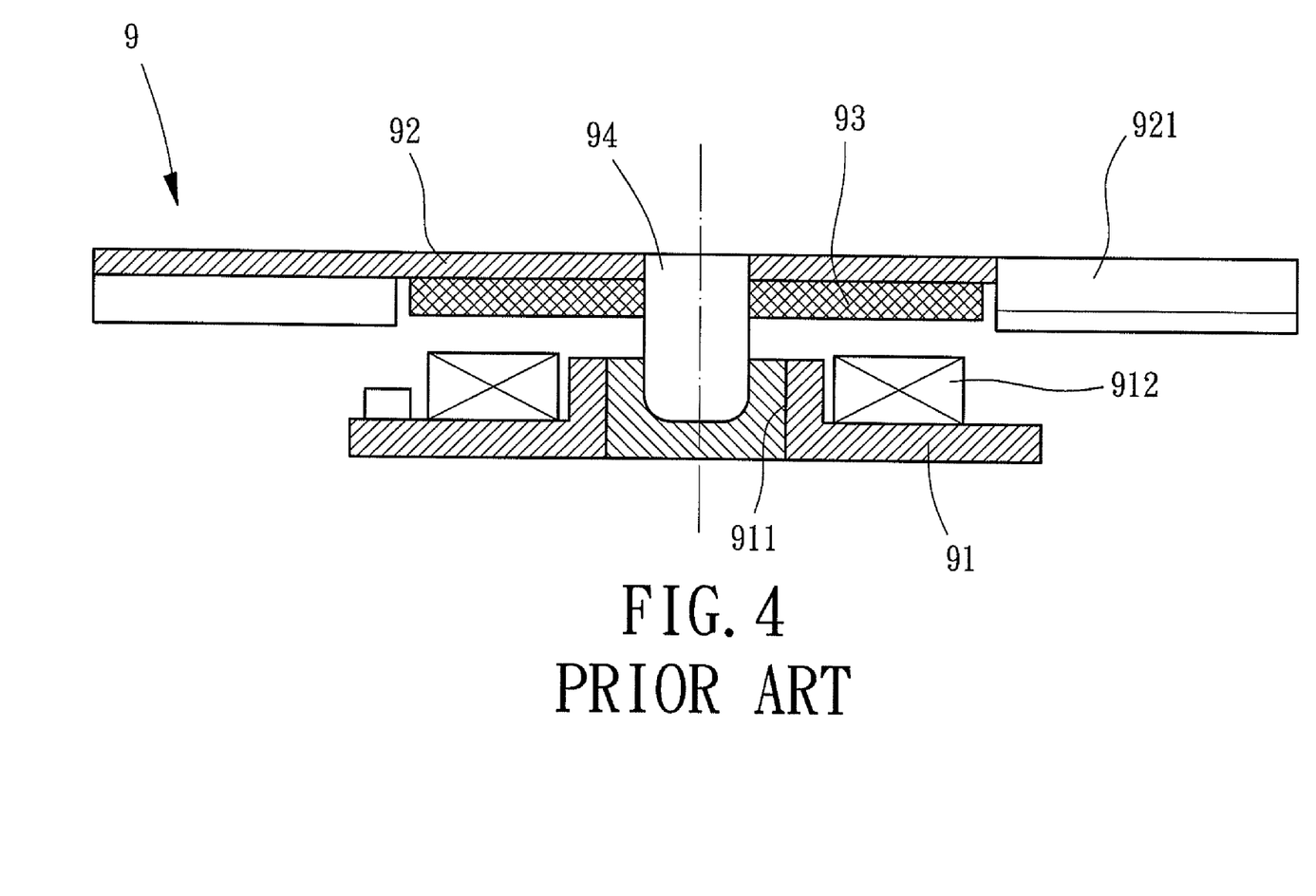
FIG. 4 shows a cross sectional view of the miniature fan of FIG. 3.

FIGS. 3 and 4 show another conventional heat-dissipating fan 9 including a base 91, an impeller 92, a disc-like magnet 93, and a shaft 94. The base 91 includes a hole 911 for rotatably receiving an end of the shaft 94. The other end of the shaft 94 is coupled to the impeller 92 that has a plurality of blades 921. A coil unit 912 is mounted on the base 91. The heat-dissipating fan 9 can be mounted on differing electronic devices or equipment for heat-dissipating purposes. An example of such a heat-dissipating fan is disclosed in Taiwan Patent No. 1293106. However, the axial heights of the base 91 and the coil unit 912 cause limitation to the reduction in the overall axial height of the heat-dissipating fan 9. As a result, it is difficult to achieve a light, compact design of the heat-dissipating fan 9 and, thus, it is difficult to mount the heat-dissipating fan 9 in miniature electronic devices or equipment.

Thus, a need exists for a miniature fan with a reduced axial height and with a reduced volume to meet the design trend of compactness and miniaturization.

SUMMARY OF THE INVENTION

The present invention solves this need and other problems in the field of miniaturization of fans by providing, in a first aspect, a miniature fan including a housing having a mounting portion with a shaft seat. A base is mounted to the mounting portion of the housing. The base includes first and second faces spaced along an axis. An electrically insulating outer layer is provided on the first face of the base. A bottom layer is provided on the second face of the base. The base further includes a coil unit intermediate the electrically insulating outer layer and the bottom layer. The coil unit is electrically connected to a drive circuit. An impeller includes a shaft and a permanent magnet. The shaft is coupled to the shaft seat of the housing and rotatable about the axis. The permanent magnet is aligned with the coil unit. The axial height of the miniature fan is reduced, and the structure of the miniature fan is simplified.

In a preferred form, the layout layer includes a plurality of circuit layers stacked along the axis. Each circuit layer has two opposite faces spaced along the axis. The coil unit includes a plurality of electrically connected coils formed on at least one of the two opposite faces of each circuit layer. More coils can be formed to increase the speed and the torque of the miniature fan. A circuit area is formed between two adjacent coils of one of the circuit layers. The drive circuit is mounted in the circuit area. An electrically insulating layer is formed on one of the two opposite faces and between any adjacent two of the circuit layers.

In preferred forms, each of the outer layer and the bottom layer forms an electrically insulating layer for the base, assuring normal operation of the miniature fan. The base includes a through-hole extending from the electrically insulating outer layer through the bottom layer along the axis. The shaft of the impeller extends through the through-hole and is coupled to the shaft seat, allowing easy assembly.

In another aspect, a miniature fan includes a housing having a mounting portion with a shaft seat. A base is mounted to the mounting portion of the housing. The base includes two faces spaced along an axis. An electrically insulating outer layer is provided on one of the faces of the base. The base further includes a coil unit on a side of the electrically insulating outer layer. The coil unit is electrically connected to a drive circuit. An impeller includes a shaft and a permanent magnet. The shaft is coupled to the shaft seat of the housing and rotatable about the axis. The permanent magnet is aligned with the coil unit.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "outer", "end", "axial", "height", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 5:
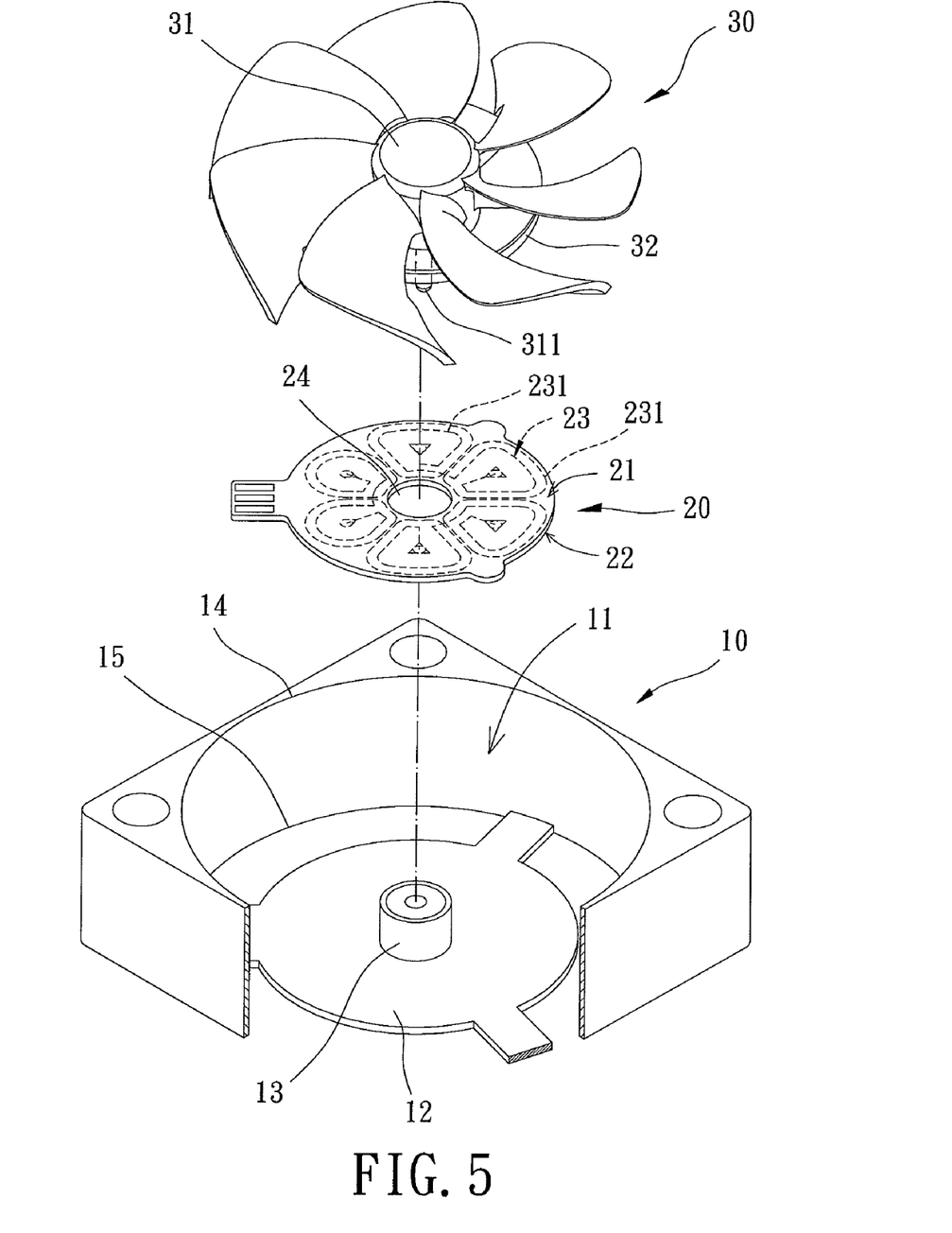
FIG. 5 shows an exploded, perspective view of a miniature fan of a first embodiment according to the preferred teachings of the present invention.
Figure 6:
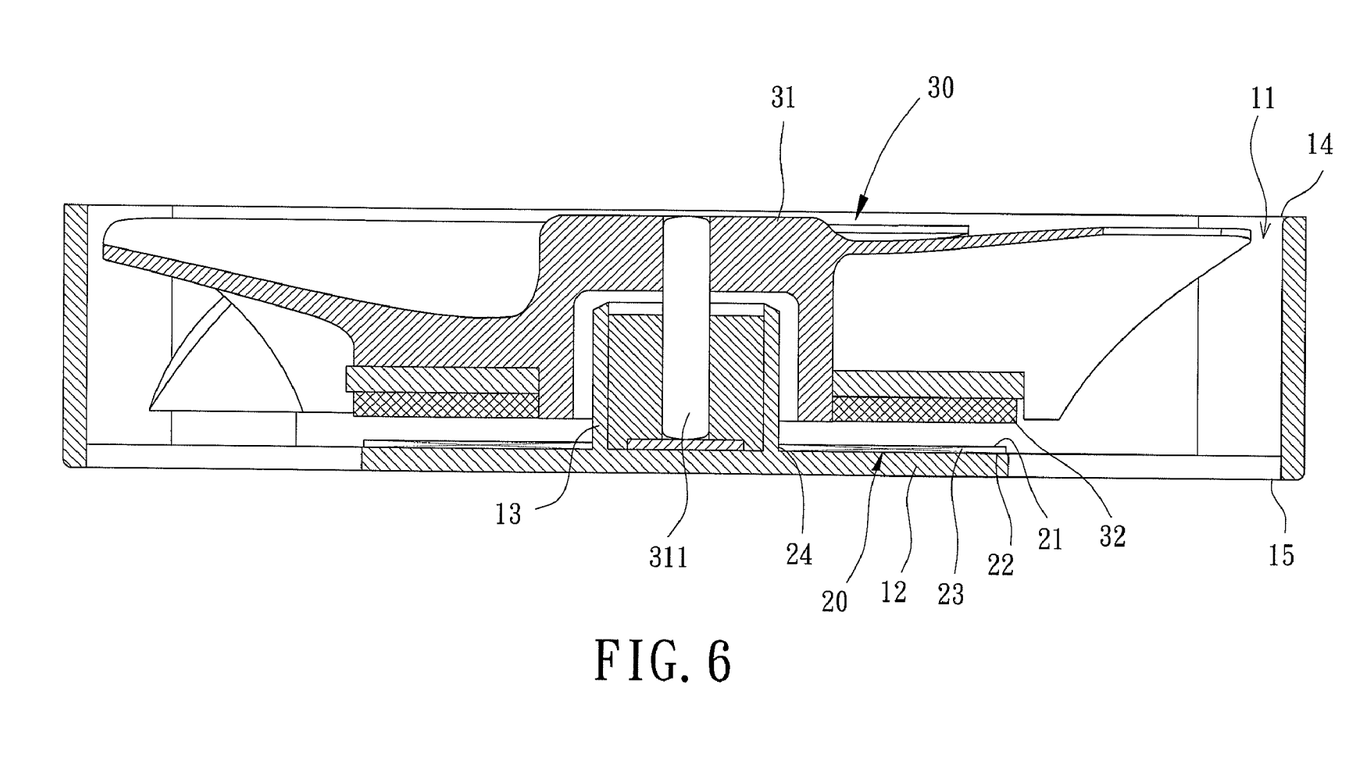
FIG. 6 shows a cross sectional view of the miniature fan of FIG. 5.

A miniature fan of a first embodiment according to the preferred teachings of the present invention is shown in FIGS. 5 and 6. The miniature fan includes a housing 10, a base 20, and an impeller 30.

The housing 10 includes a compartment 11 and a mounting portion 12 in the compartment 11. The mounting portion 12 includes a shaft seat 13. The housing 10 further includes an air inlet 14 and an air outlet 15 both in communication with the compartment 11. The housing 10 shown in FIGS. 5 and 6 is of a type for an axial flow fan. However, the housing 10 can be of a type for a blower fan.

The base 20 is preferably a printed circuit board and has opposite first and second faces spaced along an axis. A coil unit 23 is formed on one of the first and second faces by layout. The coil unit 23 includes a plurality of electrically connected coils 231. An electrically insulating outer layer 21 is provided on the first face of the base 20 to form an electrically insulating layer. Another electrically insulating bottom layer 22 is provided on the second face of the base 20 to form an electrically insulating layer. The coil unit 23 is between the electrically insulating outer layer 21 and the bottom layer 22 along the axis. The base 20 further includes a through-hole 24 extending from the electrically insulating outer layer 21 through the bottom layer 22 for coupling with the shaft seat 13. The coils 231 surround the through-hole 24. The base 20 is mounted to the mounting portion 12 with the shaft seat 13 extending through the through-hole 24 and with the bottom layer 22 in contact with the mounting portion 12. It can be appreciated that the base 20 does not have to include the bottom layer 22. In this case, the coil unit 23 is between the electrically insulating outer layer 21 and the mounting portion 12 along the axis.

The coil unit 23 can be electrically connected to a drive circuit directly mounted on the base 20. Alternatively, the coil unit 23 can be electrically connected to an external drive circuit not in direct, physical contact with the base 20.

The impeller 30 includes a hub 31 with blades and a permanent magnet 32. The hub 31 includes a shaft 311 extending through the through-hole 24 and coupled to the shaft seat 13 so that the hub 31 is rotatable in the compartment 11 of the housing 10 about the axis. The permanent magnet 32 is coupled to the hub 31 and aligned with the coil unit 23.

In use, the drive circuit can activate the coil unit 23 to interact with the permanent magnet 32 for driving the impeller 30 to rotate. Air currents are driven by the impeller 30 into the compartment 11 via the air inlet 14 and then exit the housing 10 via the air outlet 15 to proceed with heat dissipation. Thus, the miniature fan according to the preferred teachings of the present invention can be mounted in differing electronic devices or equipment and provide a desired heat-dissipating effect.

Since the coil unit 23 is on a side of the electrically insulating outer layer 21 of the base 20 (and preferably between the electrically insulating outer layer 21 and the bottom layer 22 of the base 20), the coil unit 23 can be integrated into an interior of the base 20 without protruding out of the electrically insulating outer layer 21 of the base 20. Specifically, no coils are located between the impeller 30 and the electrically insulating outer layer 21 of the base 20. The height of the base 20 along the axis is not significantly increased, although the coil unit 23 is integrated into the base 20 by layout. The overall height of the miniature fan along the axis is reduced while having a simplified structure. Thus, the miniature fan formed by the base 20, the housing 10, and the impeller 30 according to the preferred teachings of the present invention meets the design trend of compactness and miniaturization.

Figure 7:
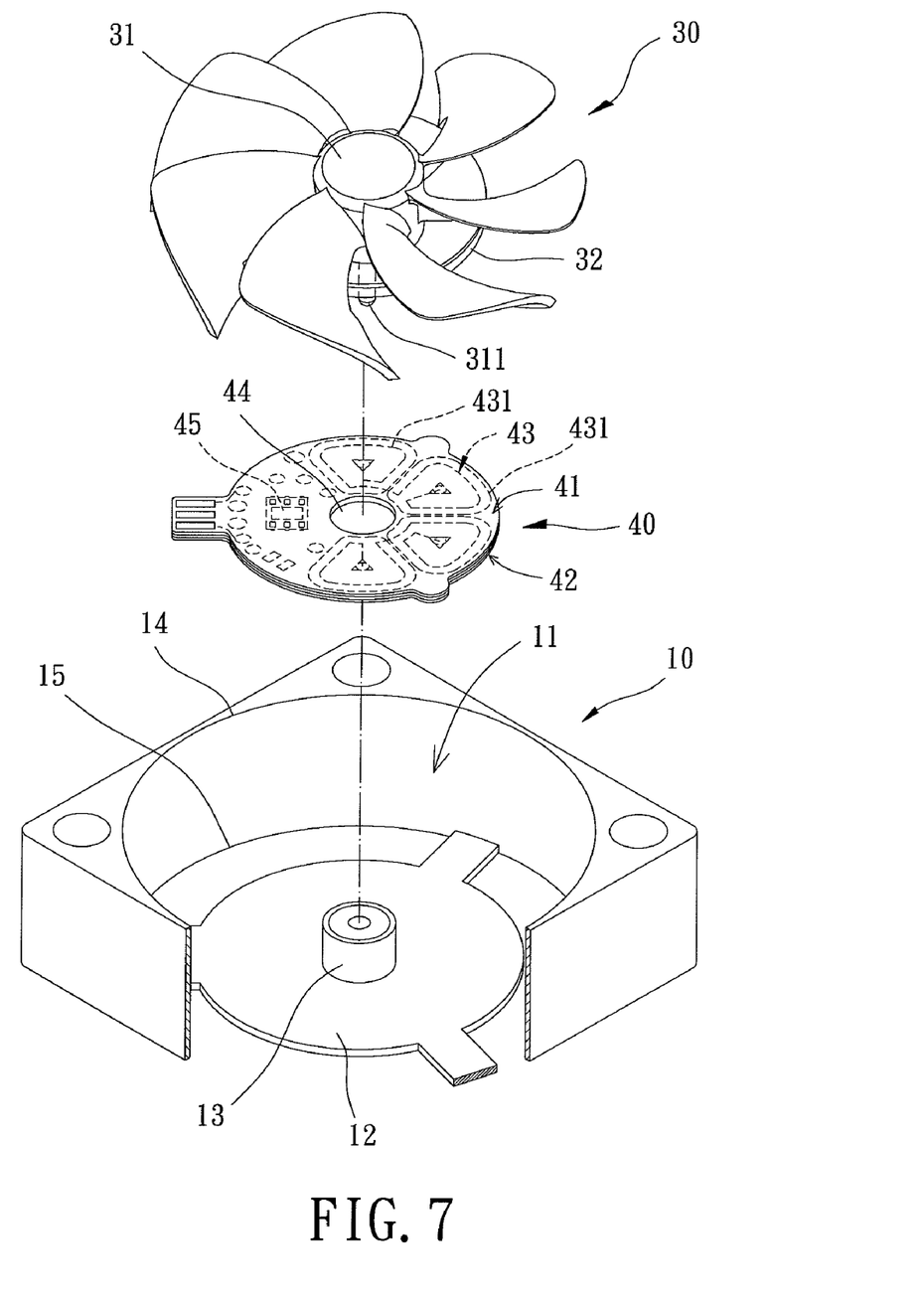
FIG. 7 shows an exploded, perspective view of a miniature fan of a second embodiment according to the preferred teachings of the present invention.
Figure 8:
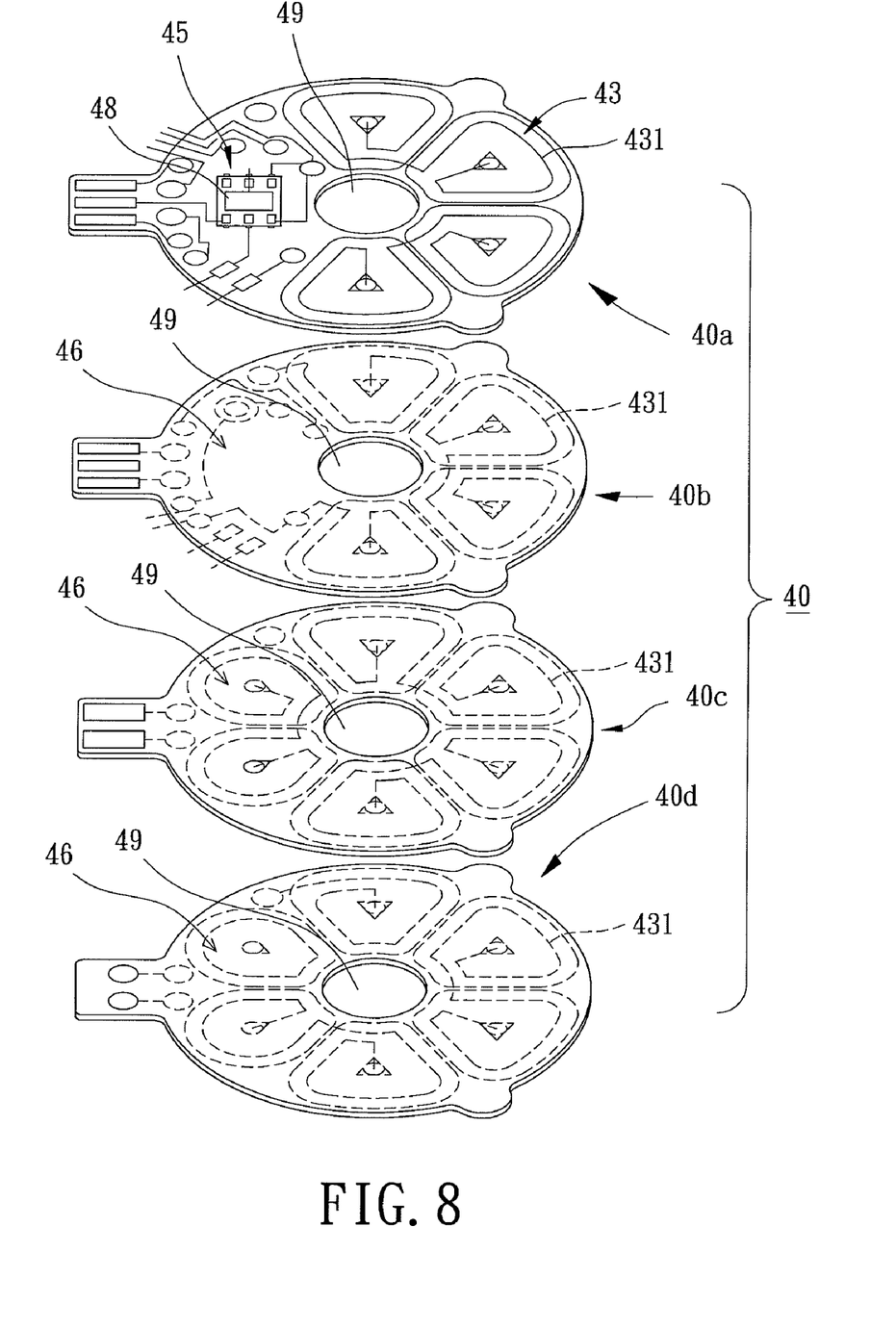
FIG. 8 shows an exploded, perspective view of a base of the miniature fan of FIG. 7.

FIGS. 7 and 8 show a miniature fan of a second embodiment according to the preferred teachings of the present invention. The miniature fan includes a housing 10, a base 40, and an impeller 30. The housing 10 and the impeller 30 of the second embodiment are substantially the same as those of the first embodiment and, thus, not described in detail to avoid redundancy.

The base 40 includes a plurality of circuit layers. In the preferred form shown in FIGS. 7 and 8, the base 40 has first, second, third, and fourth circuit layers 40a, 40b, 40c, and 40d stacked along the axis. An outer layer 41 and a bottom layer 42 are provided on opposite faces of the base 40 formed by the first, second, third, and fourth circuit layers 40a, 40b, 40c, and 40d. Preferably, the outer layer 41 and the bottom layer 42 are electrically insulative to provide electrically insulating layers for the base 40. Each circuit layer 40a, 40b, 40c, and 40d has two faces spaced along the axis. An electrically insulating layer 46 can be formed between two mutually facing faces of two adjacent circuit layers 40a and 40b, 40b and 40c, 40c and 40d. In the preferred form shown in FIGS. 7 and 8, an electrically insulating layer 46 is formed on a face of each of the second, third, and fourth circuit layers 40b, 40c, and 40d. The base 40 includes a coil unit 43 formed on a side of the electrically insulating outer layer 41 by layout. The coil unit 43 includes a plurality of electrically connected coils 431 formed on at least one of the faces of each of the first, second, third, and fourth circuit layers 40a, 40b, 40c, and 40d. Note that an outer face of the circuit layer 40a forms an outer face of the whole base 40, and an outer face of the circuit layer 40d forms another outer face of the whole base 40. Each circuit layer 40a, 40b, 40c, and 40d has a through-hole 49. When the first, second, third, and fourth circuit layers 40a, 40b, 40c, and 40d are stacked together, the through-holes 49 form a through-hole 44 of the whole base 40 extending from the electrically insulating outer layer 41 through the bottom layer 42.

The coils 431 can be formed by layout on the faces of the first, second, third, and fourth circuit layers 40a, 40b, 40c, and 40d that form the base 40 to increase the total turns of the coils 431. Thus, the speed and the torque of the miniature fan according to the preferred teachings of the present invention can be increased without significantly increasing the overall axial height of the base 40 and without changing the width of the base 40, meeting the design trend of compactness and miniaturization.

A drive circuit 45 can be directly formed in any one of the circuit layers 40a, 40b, 40c, and 40d. In the preferred form shown in FIGS. 7 and 8, the drive circuit 45 is formed on the outer face of the first circuit layer 40a. A circuit area 48 can be formed between two adjacent coils 431 of the first circuit layer 40a to provide a space for receiving the drive circuit 45. By incorporating the drive circuit 45 into the base 40, the complexity of structure and assembly can be reduced.

As mentioned above, since the coil unit 23, 43 of the base 20, 40 is on a side of the electrically insulating outer layer 21, 41 (and preferably between the electrically insulating outer layer 21, 41 and the bottom layer 22, 42), the axial height and the overall volume of the miniature fan according to the preferred teachings of the present invention are reduced, meeting the design trend of compactness and miniaturization.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A miniature fan comprising, in combination:
   a housing including a mounting portion having a shaft seat;
   a base mounted to the mounting portion of the housing, with the base including first and second faces spaced along an axis, with an electrically insulating outer layer provided on the first face of the base, with a bottom layer provided on the second face of the base, with the base further including a coil unit intermediate the electrically insulating outer layer and the bottom layer and integrated into an interior of the base, with the coil unit electrically connected to a drive circuit; and
   an impeller including a shaft and a permanent magnet, with the shaft coupled to the shaft seat of the housing and rotatable about the axis, with the permanent magnet aligned with the coil unit,
   with the base including a plurality of circuit layers stacked along the axis, with each of the circuit layers having two opposite faces spaced along the axis, and with the coil unit including a plurality of electrically connected coils formed on at least one of the two opposite faces of each of the circuit layers, and
   with a circuit area formed between two adjacent coils of one of the circuit layers, and with the drive circuit mounted in the circuit area.

2. The miniature fan as claimed in claim 1, further comprising a plurality of electrically insulating layers, with each of the electrically insulating layers being formed on one of the two opposite faces and between any adjacent two of the circuit layers.

3. The miniature fan as claimed in claim 1, with the bottom layer being an electrically insulating layer.

4. The miniature fan as claimed in claim 3, with the base further including a through-hole extending from the electrically insulating outer layer through the bottom layer, with the shaft of the impeller extending through the through-hole of the base and coupled to the shaft seat of the housing.

5. The miniature fan as claimed in claim 1, with the base further including a through-hole extending from the electrically insulating outer layer through the bottom layer, with the shaft of the impeller extending through the through-hole of the base and coupled to the shaft seat of the housing.

6. A miniature fan comprising, in combination:
   a housing including a mounting portion having a shaft seat;
   a base mounted to the mounting portion of the housing, with the base including first and second faces spaced along an axis, with an electrically insulating outer layer provided on the first face of the base, with the base further including a coil unit on a side of the electrically insulating outer layer, with the coil unit electrically connected to a drive circuit; and
   an impeller including a shaft and a permanent magnet, with the shaft coupled to the shaft seat of the housing and rotatable about the axis, with the permanent magnet aligned with the coil unit,
   with the base including a plurality of circuit layers stacked along the axis, with each of the circuit layers having two opposite faces spaced along the axis, and with the coil unit including a plurality of electrically connected coils formed on at least one of the two opposite faces of each of the circuit layers, and
   with a circuit area formed between two adjacent coils of one of the circuit layers, and with the drive circuit mounted in the circuit area.

7. The miniature fan as claimed in claim 6 further comprising a plurality of electrically insulating layers, with each of the electrically insulating layers being formed on one of the two opposite faces and between any adjacent two of the circuit layers.

* * * * *